(12) United States Patent
Tani

(10) Patent No.: US 6,848,530 B2
(45) Date of Patent: Feb. 1, 2005

(54) HYDROMECHANICAL SPEEDCHANGE DEVICE AND VEHICLE HAVING SPEED CHANGE DEVICE MOUNTED THEREON

(75) Inventor: Nobuyuki Tani, Osaka (JP)

(73) Assignee: Sauer-Danfoss-Daikin Ltd., Osaka (JP)

( * ) Notice: Subject to any disclaimer, the term of this patent is extended or adjusted under 35 U.S.C. 154(b) by 93 days.

(21) Appl. No.: 10/258,433

(22) PCT Filed: Feb. 14, 2002

(86) PCT No.: PCT/JP02/01276

§ 371 (c)(1),
(2), (4) Date: Oct. 24, 2002

(87) PCT Pub. No.: WO02/064999

PCT Pub. Date: Aug. 22, 2002

(65) Prior Publication Data

US 2003/0150662 A1 Aug. 14, 2003

(30) Foreign Application Priority Data

Feb. 14, 2001 (JP) ........................................ 2001-036593

(51) Int. Cl.[7] .............................................. B60K 1/00
(52) U.S. Cl. ...................... 180/292; 180/297; 180/307; 180/365; 180/367; 180/369; 180/374
(58) Field of Search ................................ 180/291, 292, 180/297, 305, 307, 364, 365, 367, 369, 374, 377, 378; 475/72, 81

(56) References Cited

U.S. PATENT DOCUMENTS

| | | | | |
|---|---|---|---|---|
| 3,703,107 A | * | 11/1972 | Piret | 475/66 |
| 4,750,381 A | * | 6/1988 | Kita et al. | 475/80 |
| 5,129,285 A | * | 7/1992 | Sugano et al. | 74/730.1 |
| 5,193,416 A | * | 3/1993 | Kanayama | 74/733.1 |

(List continued on next page.)

FOREIGN PATENT DOCUMENTS

| | | |
|---|---|---|
| JP | 46-16679 Y1 | 6/1971 |
| JP | 5-85398 A | 4/1993 |
| JP | 5-126233 A | 5/1993 |
| JP | 07-113454 A | 5/1995 |

OTHER PUBLICATIONS

Microfilm of the Specification and Drawings Annexed to the Request of Japanese Utility Model Application No. 136499/1979 (Laid Open No. 53628/1981) Yanmar Diesel Engine Co., Ltd.), May 11, 1981.

*Primary Examiner*—Christopher P. Ellis
*Assistant Examiner*—Brian Swenson
(74) *Attorney, Agent, or Firm*—Donald R. Studebaker; Nixon Peabody, LLP

(57) ABSTRACT

An HMT apparatus (T) is mounted on a vehicle (A). In the HMT apparatus (T), input rotational force from an engine (13) is once divided into two systems which are then transmitted by an MT device (23) and by an HST device (24) respectively and are re-synthesized for transfer toward wheels (12) and (16). The HMT apparatus (T) is disposed on the vehicle-body right side of the engine (13) which is sideways-mounted on a vehicle body (1), and its input and output shafts (25) and (26) are disposed in parallel with a crank shaft (13a) of the engine (13) and are disposed to run parallel with each other. The input shaft (25) is coupled directly to the crank shaft (13a) and an input gear (27) of the MT device (23) is mounted on the input shaft (25), and a hydraulic piston pump (30) of the HST device (24) is connected to the right side end of the input shaft (25). A planetary gear mechanism (28) of the MT device (23) is connected to the right side end of the output shaft (26), and a hydraulic piston motor (31) of the HST device (24) is connected to the right side of the planetary gear mechanism (28). By virtue of such arrangement, it is possible to improve the degree of freedom of the layout of each component of the HMT apparatus (T), to reduce axial dimensions, and further to provide improvement in the cooling property and maintenance property of the section of the HST device (24).

7 Claims, 7 Drawing Sheets

U.S. PATENT DOCUMENTS

| | | | | |
|---|---|---|---|---|
| 5,421,790 A | * | 6/1995 | Lasoen | 475/78 |
| 5,542,307 A | * | 8/1996 | Hasegawa et al. | 74/15.63 |
| 5,946,983 A | * | 9/1999 | Brambilla | 74/330.1 |
| 6,145,409 A | * | 11/2000 | Auer | 74/730.1 |
| 6,440,026 B1 | * | 8/2002 | Johnson et al. | 475/81 |
| 6,668,964 B2 | * | 12/2003 | Braud | 180/292 |

* cited by examiner

HYDROMECHANICAL SPEEDCHANGE DEVICE AND VEHICLE HAVING SPEED CHANGE DEVICE MOUNTED THEREON

TECHNICAL FIELD

The present invention relates in general to a hydro-mechanical transmission apparatus which is a combination of a hydro-static transmission device implemented by a variable displacement piston pump/motor and a mechanical transmission device, and to a vehicle which is equipped with such a transmission apparatus. This invention relates in particular to the technical field of the layout of an input and output shafts of a transmission apparatus suitable for cases where the transmission apparatus is disposed under the driver's seat, as in an all-terrain vehicle (ATV) (e.g., a three-wheeled buggy vehicle and a four-wheeled buggy vehicle), a tractor, a motor bicycle, and other vehicle.

BACKGROUND ART

As a transmission apparatus for use in vehicles such as a four-wheeled buggy vehicle, transmission apparatus of the type having a continuously variable transmission device by a belt power transmission mechanism have been used extensively. Such a non-stage transmission device of the belt type requires frequent maintenance, particularly in severe conditions. Therefore, in recent years such transmission apparatus have been replaced by hydro-static transmission (HST) devices.

For example, Japanese Patent Application Kokai No. H07-113454 discloses a hydro-mechanical transmission (HMT) apparatus, i.e., a combination of a mechanical transmission (MT) device and an HST device, for use in a motor bicycle. In this prior art transmission apparatus, an in-line piston pump and a piston motor which together constitute the HST device are disposed opposite in coaxial alignment, and cylinder barrels of the pump and the motor are made integral with an output shaft at the center so that the entire HMT apparatus is shaped like a cylinder and can be laid out, like a train of gears, etc. More specifically, the HMT apparatus is disposed at the rear of a single cylinder engine sideways-mounted on the vehicle body so that its output shaft runs parallel with a crank shaft, in other words the output shaft is so disposed as to extend in the vehicle width direction. Further, a primary speed-reduction mechanism and a secondary speed-reduction mechanism are disposed apart from each other on the right and left sides of the HMT apparatus, respectively, whereby the entire transmission apparatus is prevented from protruding horizontally beyond the engine.

Problems for Solution

However, for the case of the aforesaid prior art transmission apparatus, the in-line piston pump and the in-line piston motor which are relatively elongated in the axial direction are disposed opposite each other in coaxial alignment. This inevitably results in elongating, in totality, the piston pump and the piston motor in the axial direction (vehicle width direction). Because of this, particularly in some vehicles such as an ATV and a motor bicycle in which the transmission apparatus is disposed under a driver's seat of the ride-on type, there actually exists a strict limit on the layout of each component part of the transmission apparatus when trying to avoid interference with the driver's legs.

Further, because of the aforesaid arrangement that the pump and the motor are placed opposite to each other, the HST device section including the pump and the motor is inevitably located nearer to the inside of the transmission apparatus, therefore making it difficult to sufficiently cool the HST device whose heat generation is, by nature, greater than that of the MT device. As a result, troubles due to the rise in operating fluid temperature tend to take place. Besides, neither the maintenance nor the individual operation testing of the HST device section located nearer to the inside of the transmission apparatus is easy to carry out. Accordingly, the reliability of the HST device may drop and the durability/reliability of the entire transmission apparatus may be reduced.

Additionally, as described above, the HST device section is located nearer to the inside of the transmission apparatus, the operating fluid for the HST device must be commonized to either the engine oil or gear oil. However, generally the operating fluid of the HST device greatly differs in adequate temperature condition from the gear oil, let alone the engine oil. Accordingly, it is difficult to adequately maintain the characteristics of the HST operating fluid. Further, inconvenience, such as operating fluid deterioration and sludge contamination, tends to take place.

Bearing in mind the aforesaid drawbacks, the present invention was made. Accordingly, an object of the present invention is to reduce the axial dimension of the entire transmission apparatus while at the same time improving the degree of layout freedom and further to provide improved cooling and easy maintenance of the HST device section, by contriving the layout of the hydro-mechanical transmission (HMT) apparatus, particularly the layout of the HST apparatus section thereof.

DISCLOSURE OF THE INVENTION

With a view to providing solutions to the foregoing drawbacks, the present invention takes the following solving means.

A first invention is premised on a hydro-mechanical transmission apparatus (T) which comprises: an input shaft (25); an output shaft (26); a mechanical transmission device (23) having a differential gear mechanism (28) which is interposed between the input shaft (25) and the output shaft (26); and a hydro-static transmission device (24) having a hydraulic pump (30) which is connected to the input shaft (25) and a hydraulic motor (31) which is connected to the pump (30) by a closed circuit (32) as well as to the output shaft (26) through the differential gear mechanism (28) wherein at least one of the pump (30) and the motor (31) is variable in displacement.

And, in the hydro-mechanical transmission apparatus (T), the input shaft (25) and the output shaft (26) are laid out in parallel with each other and the hydraulic pump (30) is connected to one side end in axial direction of the input shaft (25) whereas the other side end of the input shaft (25) is connected to a shaft (13a) of a drive source (13), and an input gear (27) of the mechanical transmission device (23) is mounted on between the both ends of the input shaft (25) so as to rotate integrally therewith. And, the differential gear mechanism (28) is connected to the one side end of the output shaft (26) and the hydraulic motor (31) is connected to the one side of the differential gear mechanism (28).

In accordance with the first invention, the input and output shafts (25) and (26) of the hydro-mechanical transmission (HMT) apparatus (T) are so disposed as to run parallel with each other, and the hydraulic pump (30) on the input side and the hydraulic motor (31) on the output side are not in coaxial alignment. As a result of such arrangement, the axial dimension of the hydro-static transmission (HST) device

(24) made up of the pump (30) and the motor (31) is reduced naturally. Further, the degree of freedom of laying out the section of the HST device (24) will be increased.

Further, with the HMT apparatus (T) mounted on the vehicle (A) and connected to the drive source (13), the input shaft (25) and the hydraulic pump (30) are disposed in order on one side with respect to the direction of the shaft (13a) of the drive source (13), and the output shaft (26), the differential gear mechanism (28), and the hydraulic motor (31) are disposed in sequence in parallel with the input shaft (25) and the hydraulic pump (30). In other words, as a whole, the HMT apparatus (T) is disposed on one of axial sides of the drive source (13) and within the HMT apparatus (T), the section of the HST device (24) comprised of the pump (30) and the motor (31) is located apart from the drive source (13) and relatively nearer to the outside.

Generally the drive source (13) is positioned in the vicinity of the center of the vehicle (A), so that the section of the HST device (24), which is, as described above, located apart from the drive source (13) on one axial-side of the drive source (13), is located relatively nearer to the vehicle-body outside in the power train. This facilitates cooling of the section of the HST device (24) by wind produced by vehicle movement or the like. Further, since the maintenance of the section of the HST device (24) located near to the vehicle-body outside is easy to carry out, thereby increasing its reliability and improving the durability/reliability of the entire HMT apparatus (T).

Furthermore, since it is arranged such that the section of the HST device (24) is located nearer to the outside, this makes it relatively easy to provide such a structure that the operating fluid of the HST device (24) can be circulated separately from other oils such as gear oil. This therefore facilitates maintenance of the characteristics of the operating fluid of the HST device (24) at adequate levels and the occurrence of trouble such as deterioration and sludge contamination will be prevented.

In a second invention, the input shaft (25) of the hydro-mechanical transmission (HMT) apparatus (T) is connected to the shaft (13a) of the drive source (13) in such a way that it receives output rotation directly from the shaft (13a).

Such arrangement eliminates the need for the provision of a primary speed-reduction mechanism between the drive source (13) and the HMT apparatus (T), thereby achieving the weight saving, downsizing, and cost reduction of the power train.

In a third invention, a casing (81) of the hydro-static transmission (HST) device (24) is a separate structure from a casing (80) of the mechanical transmission (MT) device (23).

As a result of such arrangement, it becomes possible to remove only the section of the HST device (24) located near to the vehicle-body outside from the HMT apparatus (T). This makes the maintenance of the HST device (24) even easier and it is possible to subject only the HST device (24) to independent operation testing. Because of this, the total reliability of the HMT apparatus (T) and that of the HST apparatus (24) can be improved to a further extent.

In a fourth invention, a secondary transmission device (14) is connected to the other side end of the output shaft (26) of the hydro-mechanical transmission (HMT) apparatus (T).

Although such arrangement makes it possible to extend the range of transmission by the secondary transmission device (14), it is required to secure a space for the placement of the secondary transmission device (24) in the power train.

The fact that the first invention makes it possible to increase the degree of freedom of laying out each component part of the HMT apparatus (T) is particularly useful for securing such a space.

A fifth invention is intended for a vehicle (A) equipped with a transmission apparatus which changes the speed of output rotation from a drive source (13) for transfer toward wheels (12) and (16). In the first place, the drive source (13) is sideways-mounted on the vehicle (A), with a shaft (13a) of the drive source (13) oriented in the direction of the vehicle width. Further, the transmission apparatus is a hydro-mechanical transmission apparatus (T) comprising: an input shaft (25); an output shaft (26); a mechanical transmission device (23) having a differential gear mechanism (28) which is interposed between the input shaft (25) and the output shaft (26); and a hydro-static transmission device (24) having a hydraulic pump (30) which is connected to the input shaft (25) and a hydraulic motor (31) which is connected to the hydraulic pump (30) by a closed circuit (32) as well as to the output shaft (26) through the differential gear mechanism (28). And, at least one of the pump (30) and the motor (31) is variable in displacement.

And, the mechanical transmission (MT) device (23) and the hydro-static transmission (HST) device (24) are disposed nearer to one side of the vehicle body with respect to a vehicle width direction than the center of the drive source (13). The input shaft (25) and the output shaft (26) extend parallel with the shaft (13a) of the drive source (13) in a vehicle width direction and are disposed in parallel with and separated apart from each other in a vehicle body longitudinal direction. And, the hydraulic pump (30) is connected to one side end in vehicle width direction of the input shaft (25) whereas the other side end of the input shaft (25) is connected to a shaft (13a) of a drive source (13). And, an input gear (27) of the mechanical transmission device (23) is mounted on between the both ends of the input shaft (25) so as to rotate integrally therewith. The differential gear mechanism (28) is connected to the one side end in vehicle width direction of the output shaft (26) and the hydraulic motor (31) is connected to the one side in vehicle width direction of the differential gear mechanism (28).

In accordance with the vehicle (A) which is equipped with the HMT apparatus (T) having the aforementioned arrangement, the degree of layout freedom in the section of the HST device (24) of the HMT apparatus (T) is high, as in the first invention, and regardless of the arrangement that the HMT apparatus (T) is disposed in parallel with the drive source (13) that is sideways-mounted on the vehicle (A), it is possible to suppress the increase in size with respect to the vehicle width direction. Since the section of the HST device (24) is disposed on one of sides of the power train with respect to the vehicle width direction, working and effects such as great improvement in cooling and maintenance are obtained.

In a sixth invention, at least a part of the hydro-mechanical transmission (HMT) apparatus (T) according to the fifth invention is located underneath a driver's seat (6) of the vehicle (A).

In such a case, the problem is that a driver's leg may interfere with the HMT apparatus (T). Accordingly, the effect that the increase in size of the HMT apparatus (T) with respect to the vehicle width direction can be suppressed (the fifth invention) is particularly useful.

Effects of the Invention

In accordance with the present invention, the input and output shafts (25) and (26) of the hydro-mechanical transmission (HMT) apparatus (T) are disposed in parallel with each other, as a result of which the degree of freedom of laying out the section of the HST device (24) of the HMT apparatus (T) is improved and the downsizing of the entire HMT apparatus (T) is made possible. Further, the section of the HST device (24) is disposed nearer to the outside of the HMT apparatus (T) so that the section of the HST device (24) is located nearer to the outside of the vehicle when mounted thereon. This facilitates cooling of the HST device (24) and provides easy maintenance, thereby achieving improvement in the durability and reliability of the HST device (24). Besides, it is possible to circulate the operating fluid of the HST device (24) separately from other oils such as gear oil. This facilitates maintenance of the characteristics of the operating fluid.

The second invention eliminates the need for the provision of a primary speed-reduction mechanism between the drive source (13) and the transmission, thereby achieving the weight saving, downsizing, and cost reduction of the power train.

In accordance with the third invention, it becomes possible to remove only the section of the HST device (24) from the HMT apparatus (T). This makes the maintenance of the HST device (24) even easier and the durability and reliability of the HMT apparatus (T) can be improved to a further extent.

In accordance with the fourth invention, the effects of the first invention are particularly useful when securing a space for the placement of the secondary transmission device (14) in the power train.

Further, in a vehicle that is equipped with a hydro-mechanical transmission (HMT) apparatus formed in accordance with the present invention, the same effects as the first invention can be obtained. Particularly, it is possible to suppress the increase in size of the HMT apparatus (T) with respect to the vehicle width direction, thereby improving the riding comfortability of a driver's seat. Furthermore, the section of the HST device (24) of the HMT apparatus (T) can be disposed on a side of the vehicle (A), so that excellent effects such as great improvement in cooling and maintenance can be obtained (the fifth invention). Such effects are particularly useful for cases where interference of the HMT apparatus (T) with a leg of the driver tends to become a problem (the sixth invention).

BEST MODE FOR CARRYING OUT THE INVENTION

Hereinafter, preferred embodiments of the present invention will be described in detail with reference to the Figures.

Embodiment 1

Figure 1:
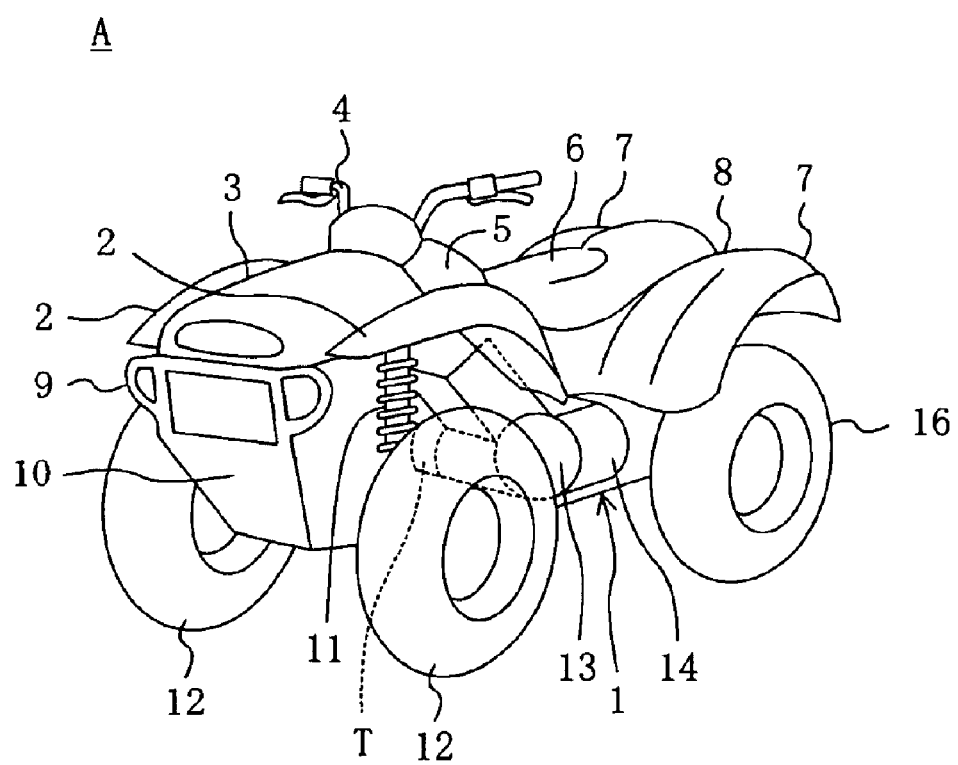
FIG. 1 is a perspective view schematically illustrating an external appearance of an ATV that is equipped with an HMT (hydro-mechanical transmission) apparatus according to the present invention.

Hereinafter, a first embodiment of the present invention will be described with reference to the Figures. The first embodiment is an embodiment in which a hydro-mechanical transmission (HMT) apparatus (T) according to the present invention is mounted on a four-wheel-drive ATV (A). Referring to FIG. 1, there is shown an external appearance of the ATV (A). Reference numeral (1) denotes a vehicle body comprised of a pipe frame, details of which are left out. Disposed on an upper side of the vehicle body (1) in the order given (from front to rear) are a front cowl (3) having, at either side thereof, fenders (2) and (2), a handle (4), a fuel tank (5), a seat (driver's seat) (6), and a rear cowl (8) having, at either side thereof, fenders (7) and (7).

Provided at the vehicle body forefront under the front cowl (3) is an under cowl (10) formed integrally with a bumper (9). And, a right and left front wheels (12) and (12) are disposed, through strut suspensions (11), at the rear of the under cowl (10). Further, a power train, which is made up of an engine (drive source) (13), an HMT apparatus (T), and a secondary transmission device (14), is disposed extendedly from under the fuel tank (5) to under the seat (6), and the HMT apparatus (T) is located, substantially directly under the seat (6). And, rear wheels (16) and (16) are disposed, through trailing arm suspensions (not shown), at the rear of the power train at either side of the vehicle body (1).

Figure 2:
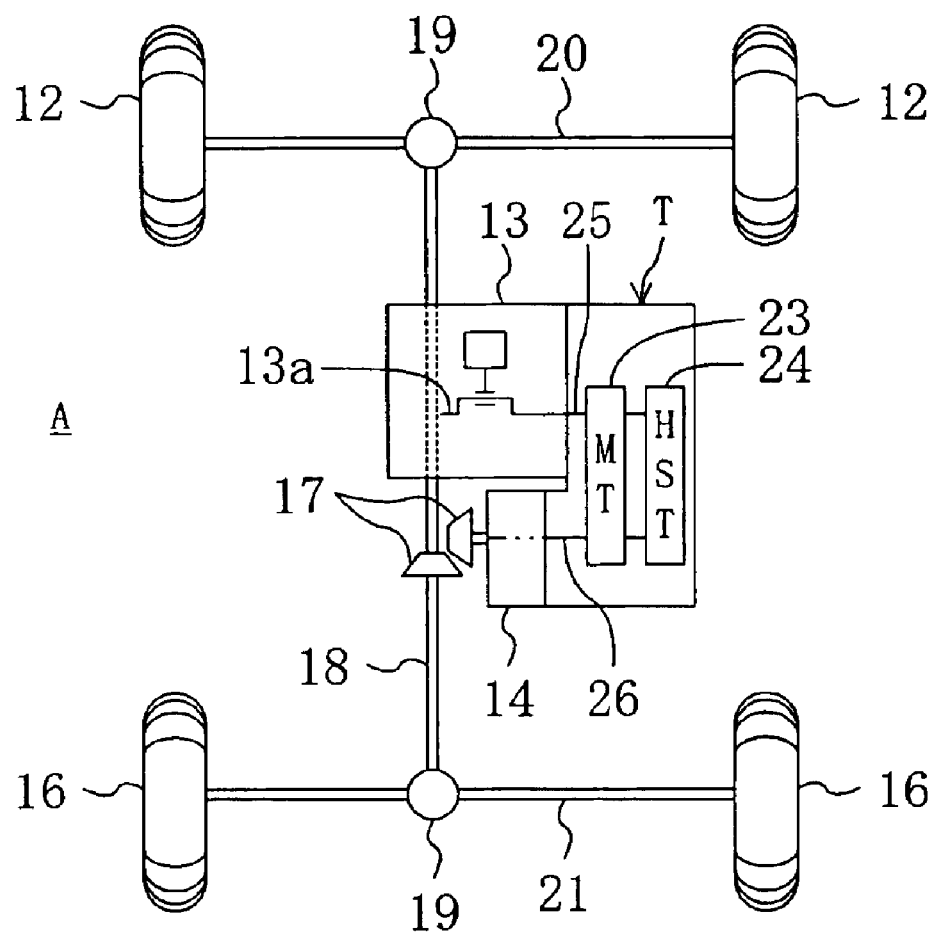
FIG. 2 is a view showing a frame format of an arrangement of a power transmission path of the ATV when viewed from above the vehicle body.

FIG. 2 is a view showing a frame format of an arrangement of a power transmission path extending from the engine (13) of the ATV (A) to the wheels (12) and to the wheels (16), when viewed from above the vehicle body, and the engine (13) is sideways-mounted on the vehicle body, with a crank shaft (13a) oriented in the direction of the width of the ATV (A). The HMT apparatus (T) is disposed in close proximity to a crank case so that it is located on the right side of the engine (13) (i.e., on one of sides with respect to the vehicle width direction). The rear end of the HMT apparatus (T) extends beyond the crank case rear end of the engine (13) to the rear of the vehicle body. Disposed on the left side thereof (i.e., on the vehicle width direction other side), in other words, disposed at the rear of the engine (13) are a secondary transmission device (14) and a pair of bevel gears (17) and (17) for changing the direction of output rotation from the secondary transmission device (14). The bevel gear (17) on the driven side is mounted on a drive shaft (18) extending in the vehicle body longitudinal direction under the vehicle body (1), and the front and rear ends of the drive shaft (18) are connected, through differential gears (19) and (19), to a front axle shaft (20) and to a rear axle shaft (21), respectively. In other words, the HMT apparatus (T) is disposed nearer to the right side of the vehicle body than the center of the engine (13) with respect to the vehicle width direction. The HMT apparatus (T) is located nearer to the outside with respect to the vehicle width direction than any other components in the power train.

Figure 3:
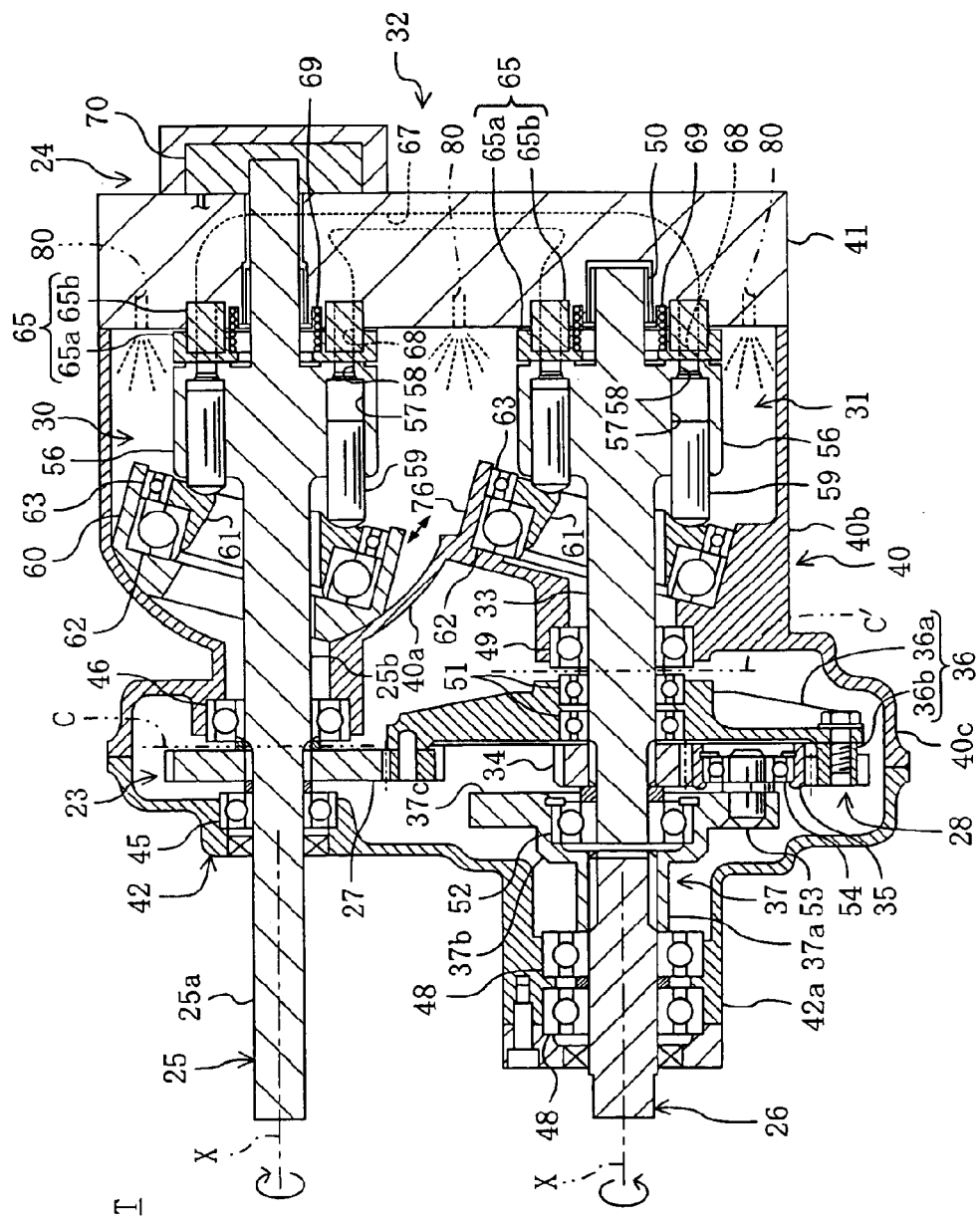
FIG. 3 is a view showing in cross section an arrangement of the HMT apparatus.

The HMT apparatus (T) once divides input rotation from the crank shaft (13a) of the engine (13), transmits the divided input rotation by the mechanical transmission (MT) device (23) and the hydro-static transmission (HST) device (24), synthesizes the transmitted input rotation by a planetary gear mechanism (differential gear mechanism) (28) of the MT device (23), and outputs the synthesized input rotation. In other words, as shown in FIG. 3 and in FIG. 4, respectively, the MT device (23) comprises an input shaft (25) directly connected to an end of the crank shaft (13a) which projects to the vehicle-body right side of the engine (13), an input gear (27) which is so mounted on an intermediate part of the input shaft (25) by splines as to rotate together with the input shaft (25), and the planetary gear mechanism (28) which is disposed in coaxial alignment with an output shaft (26) and which receives input rotation from the input gear (27). Further, the HST device (24) is constructed by connecting an in-line axial piston pump (hereinafter referred to just as a piston pump) and an in-line axial piston motor (hereinafter referred to just as a motor) by a closed circuit (32).

The planetary gear mechanism (28) of the MT device (23) comprises a sun gear (34) which is mounted on a shaft (33) of the motor (31) so as to rotate integrally therewith, a plurality of planetary gears (35) (only one of which is shown in the figure) which engage with the sun gear (34) and which moves around the sun gear (34) while turning around on its axis, a ring gear (36) whose inner-peripheral internal teeth engage with the plural planetary gears (35) and which is provided with outer-peripheral external teeth which engage with the input gear (27), and a planetary carrier (37) which is mounted on the end of one side of the output shaft (26) so as to rotate integrally therewith and which rotatably supports each of the plural planetary gears (35).

And, a part of rotational force fed to the input shaft (25) is transmitted from the input gear (27) to the ring gear (36) of the planetary gear mechanism (28), whereas the rest of the rotational force is converted into hydraulic force by the piston pump (30) for forwarding to the motor (31) through the closed circuit (32) and is converted again into rotational force by the motor (31) for forwarding to the sun gear (34) mounted on the motor shaft (33). Rotational forces transmitted from the ring gear (36) and the sun gear (34) which are in rotation to the plural planetary gears (35) in engagement with the ring gear (36) and the sun gear (34) are synthesized and output to the output shaft (26) from the planetary carrier (37).

The structure of the HMT apparatus (T) will be described in greater detail. First, as shown in FIG. 3, the MT device (23) and the HST device (24) are mounted integrally in a single casing. In other words, a casing body (40) of the HMT apparatus (T) is divided by a dividing wall portion (42a) into one side (a vehicle-body right side) and anther side (a vehicle-body left side) with respect to the axial direction of the input shaft (25). An opening end of an area of the casing body (40) located nearer to the vehicle-body right side than the dividing wall portion (40a) is closed by an end cap (41), thereby defining an HST housing portion (40b) for accommodating therein the piston pump (30) and motor (31) of the HST device (24). Further, an area of the casing body (40) located nearer to the vehicle-body left side than the dividing wall portion (40a) is closed by a cover member (42), thereby defining an MT housing portion (40c) for accommodating therein the MT device (23).

In accordance with the present embodiment, the input shaft (25) of the HMT apparatus (T) is formed integrally with a pump shaft of the piston pump (30), and the integrally formed input shaft (25) is so disposed as to extend in the vehicle width direction, penetrating from the cover (42) to the dividing wall portion (40a) and to the end cap (41), on the vehicle-body front side (the upper side in the figure) of the casing body (40). And, the input shaft (25) is rotatably supported by roller bearings (45), (46), and (47) disposed on the cover (42), on the dividing wall portion (40a), and on the end cap (41), respectively. In other words, the input shaft (25) is an integral formation of two sections bordered by an area indicated by a virtual line C of the figure, namely an original input shaft portion (25a) for accepting rotation from the crank shaft (13a) and a pump shaft portion (25b) having a pump shaft function. Further, an arrangement may be made in which the input shaft and the pump shaft are formed as individual parts and they are coupled together by coupling, etc.

On the other hand, the output shaft (26) of the HMT apparatus (T) is so disposed as to extend in parallel with the input shaft (25) in the vehicle width direction on the vehicle-body rear side of the casing body (40). Further, within a cylindrical boss portion (42a) formed so as to project toward the outside of a cover member (42) (toward the left-hand side in the figure), the output shaft (26) is rotatably supported by two roller bearings (48) and (48) disposed in the boss portion (42a). In other words, the input shaft (25) and the output shaft (26) extend in parallel with the crank shaft (13a) of the engine (13) in the vehicle width direction and are disposed in parallel with and apart from each other in the vehicle longitudinal direction. Further, the output shaft (26) is located in coaxial alignment with the shaft (33) of the motor (31) and its vehicle-body left side (vehicle width direction other side) end is coupled to the main shaft of the secondary transmission device (14) by coupling (not shown), whereas the vehicle-body right side (vehicle width direction one side) end is connected to the planetary carrier (37) of the planetary gear mechanism (28).

The motor shaft (33) passes through the dividing wall portion (40a) of the casing body (40), extends in the vehicle width direction, and is rotatably supported by roller bearings (49) and (50) disposed in the dividing wall portion (40a) and in the end cap (41), respectively. And, mounted on the motor shaft (33) which passes through the dividing wall portion (40a) and projects into the inside of the MT housing portion (40c) are, in the order of nearness in position to the dividing wall portion (40a), the ring gear (36), sun gear (34), and planetary carrier (37) of the planetary gear mechanism (28). The ring gear (36) is made up of a disc-like plate portion (36a) which is rotatably mounted on the motor shaft (33) by bearings (51) and (51) and a ring-like gear portion (36b) which is attached to the plate portion located near to the outer periphery thereof, and internal teeth which engage with the planetary gear (35) from the outside are formed on the inner periphery of the gear portion (36b) whereas external teeth are formed in the outer periphery so as to engage with the input gear (27).

Further, the sun gear (34) is connected to the motor shaft (33) by splines so as to rotate integrally therewith and is so designed as to engage with the planetary gear (35) located between the ring gear (36) and the sun gear (34) from the inside. Furthermore, the planetary carrier (37) has a tubular portion (37a) which is externally inserted onto the end of the output shaft (26) and is fixed there by splines and which rotates integrally with the output shaft (26). An extended-diameter portion (37b) of relatively large diameter and a disk-like rib portion (37c) are formed at one side of the tubular portion (37a). The planetary carrier (37) is attached rotatably to the vehicle width direction other side end of the motor shaft (33) by a bearing (52) press-fit into the inside of the expanded-diameter portion (37b). A plurality of pins (53), (53), and so on (only one of which is shown in the figure) are disposed at respective positions of the rib portion (37c) of the planetary carrier (37) which are circumferentially equally spaced, and each planetary gear (35) is rotatably supported on a roller bearing (54) which is interfit to each pin (53).

To sum up, the planetary gear mechanism (28) of the MT device (23) is positioned on the vehicle-body right side of the output shaft (26) and is connected to an end of the output shaft (26) on the vehicle-body right side as well as to the shaft (33) of the motor (31) which is located on the vehicle-body right side across the dividing wall portion (40a) of the casing body (40). Alternatively, an arrangement may be made in which the motor shaft (33) is bordered at an area indicated by a virtual line C' of the figure for division into a central shaft of the planetary gear mechanism (28) and an original motor shaft (33) and these two shafts are coupled together by coupling or such at the area.

Next, the structure of the piston pump (30) of the HST device (24) will be described in greater detail. The piston pump (30) is formed by integrally mounting a cylinder barrel (56) on the pump shaft portion (25b) of the input shaft (25). Although not shown in detail in the figure, a plurality of cylinder chambers (57), (57), and so on are defined in the inside of the cylinder barrel (56). More specifically, these cylinder chambers (57) are circumferentially defined at respective locations on the circumference centered at a shaft center (X), extending in the direction of the shaft center (X). A port (58) is defined at one axial side (the right side in the figure) of its associated cylinder chamber (57) so as to open to one axial side end face of the cylinder barrel (56). On the other hand, the other side of the cylinder chamber (57) opens to the other axial side end face of the cylinder barrel (56). Each cylinder chamber (57) houses an associated piston (59) in such a way that the piston (59) can reciprocate.

Variable swash plates (60) for controlling the reciprocating stroke of the pistons (59), (59), and so on are each disposed face to face with the other end surface of its associated cylinder barrel (56). In the swash plate (60), a thrust plate (61) for holding, in abutment manner, an end of the piston (59) projecting from the cylinder chamber (57) is supported by two roller bearings (62) and (63) and is allowed to rotate smoothly around the shaft center (X) together with the piston (59) and the cylinder barrel (56). Further, the variable swash plate (60) is constructed so that it can tilt, with respect to the neutral position at which the swash plate angle becomes zero, between a maximum inclination position at which the angle of inclination of the swash plate during normal rotation is maximum and a maximum inclination position at which the angle of inclination of the swash plate during reverse rotation is maximum (see FIG. 3). The variable swash plate (60) is tilted by an actuator such as a hydraulic cylinder and a DC motor, whereby the angle of inclination can be increased or decreased.

And, when the input shaft (25) and the cylinder barrel (56) are rotationally driven by input from the engine (13), the pistons (59), (59), and so on each reciprocate for a stroke corresponding to the angle of inclination of its associated variable swash plate (60), while moving around the shaft center (X). Because of this, both the supplying of operating fluid to each cylinder chamber (57) and the draining of operating fluid from each cylinder chamber (57) are carried out. In other words, in the cylinder chamber (57) which is in the state of an operating fluid delivery stroke the piston (59) is pushed into the cylinder chamber (57) along the inclination of the swash plate (60). As a result, the operating fluid held in the inside of the cylinder chamber (57) is discharged out of the cylinder barrel (56) through the port (58). On the other hand, in the cylinder chamber (57) which is in the state of a suction stroke, upon receipt of the pressure (charge pressure) of operating fluid flowing into the cylinder chamber (57) through the port (58), the piston (59) is gradually pushed out of the cylinder chamber (57) along the inclination of the swash plate (60).

The supplying of operating fluid to each cylinder chamber (57) and the draining of operating fluid from each cylinder chamber (57) are carried out via a valve plate (65) which makes sliding contact with an end face of the cylinder barrel (56) on the port side. In other words, the valve plate (65) serves to change the state of communication of the cylinder chambers (57), (57), and so on, with respect to a pair of oil passageways (66) and (66) defined in the end cap (41), i.e., a pair of oil passageways together constituting the closed circuit (32) between the hydraulic piston pump (30) and the motor (31). Although not shown in detail in the figure, the valve plate (65) is shaped like a compressed cylinder and is provided with two hole portions (68) and (68) corresponding to the passageways (66), respectively. The hole portions (68) and (68) each are elongated in the direction of the circumference of the cylinder barrel (56) and have a circular arc-like cross section. And, as described above, the operating fluid discharged from the cylinder chamber (57) which is in the state of a delivery stroke circulates through one passageway (66) via one hole portion (68) of the valve plate (65), while on the other hand the operating fluid flowing back from the other oil passageway (66) is supplied to the cylinder chamber (57) which is in the state of a suction stroke.

Further, the valve plate (65) is of a floating type and is press-energized against a port side end face of the cylinder barrel (65) by a coil spring (69). In other words, the valve plate (65) comprises a large tubular member (65a) of relatively large diameter having a slide face which is brought into sliding contact with the port-side end face of the cylinder barrel (56) and a small tubular member (65b) which is interfit into the inside of the larger tubular member (65a). The small tubular member (65b) is press-fit into an annular groove portion formed in the end cap (41) and is fixed there, whereas the large tubular member (65a) is interfit to the small tubular member (65a) with play therebetween, and the valve plate (65) is pressed against the port-side end face of the cylinder barrel (56) by the coil spring (69).

In the way as described above, the large tubular member (65a) which is brought into sliding contact with the cylinder barrel (56) is of a floating type, which makes it possible to maintain the state of sliding contact between the port-side end face of the cylinder barrel (56) and the valve plate (65) at excellent levels by absorbing errors of the dimensions of the cylinder barrel (56) and the large tubular member (65). An O-ring or the like (not shown) is interposed between the large tubular member (65a) and the small tubular member (65b), so that the rate of operating fluid leak between the tubular members can be held below a predetermined amount.

Figure 4:
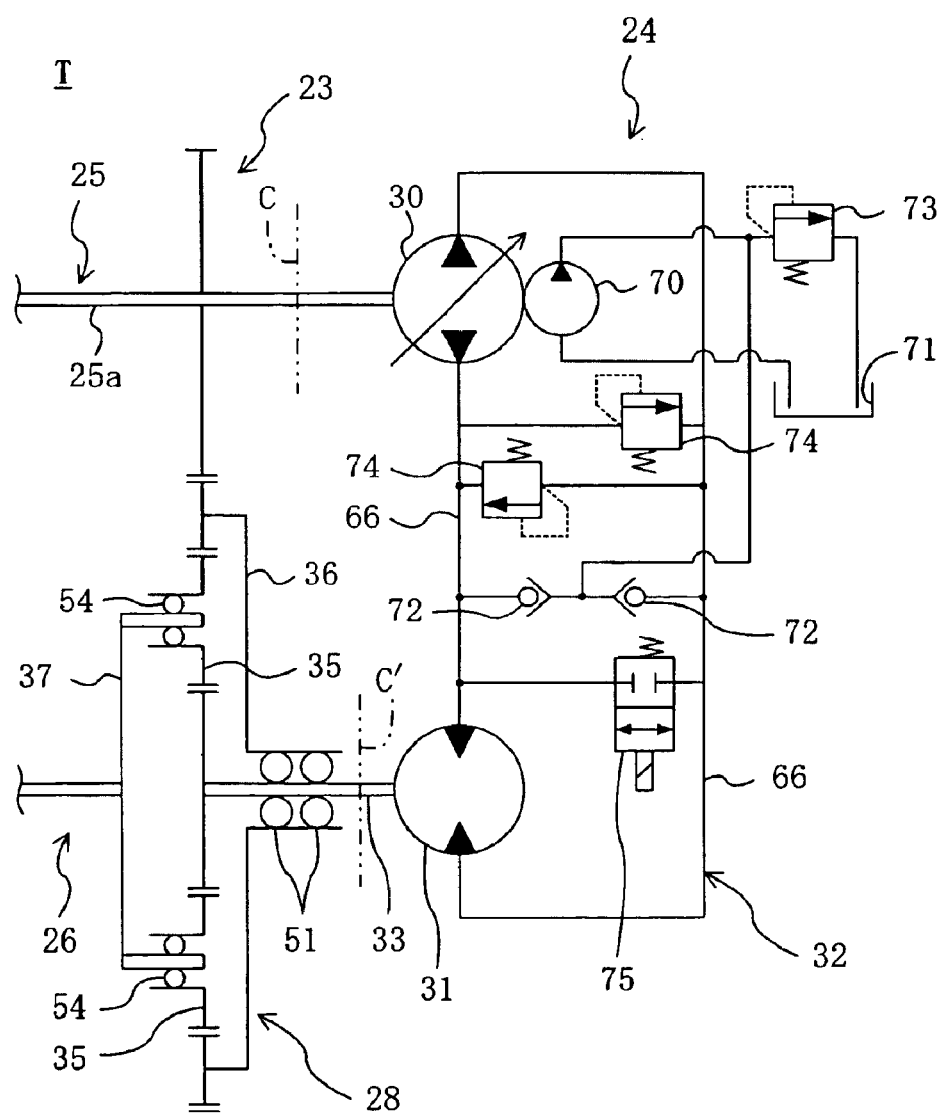
FIG. 4 is a skeleton view showing an arrangement of the HMT apparatus.

Further, the leading end of the input shaft (25) passes through a hole portion defined in the end cap (41) and its end is provided with a charge pump (70) for providing supplement for leakage oil in the closed circuit (32) of the HST device (24). This charge pump (70) may be implemented by for example a trochoid pump and as shown in FIG. 4, it is arranged such that operating fluid is drawn from an oil sump (71) independent from the oil sump of the engine (13) and is supplied, through check valves (72) and (72), to the lower in pressure of the pair of the oil passageways (66) and (66) together constituting the closed circuit (32). At this time, the pressure of the operating fluid supplied to the oil passageway (66) of lower pressure is a so-called charge pressure in the closed circuit (32) and its value is set by a bleed-off valve (73).

Further, disposed in the closed circuit (32) are a pair of relief valves (74) and (74) for relieving, when the pressure state of the higher in pressure of the pair of the oil passageways (66) and (66) goes beyond a predetermined level, the pressure of operating fluid from the high-pressure side oil passageway (66) to the low-pressure side oil passageway (66). Besides, a bypass valve (75), which is a solenoid valve, is disposed so that the paired oil passageways (66) and (66) are communicated together under certain conditions for disconnecting the transmission of power in the HST device (24). This bypass valve (75) can be switched selectively to a closed position (as shown in the figure) in which the oil passageways (66) and (66) are not communicated with each other or to a communication position in which the oil passageways (66) and (66) are communicated with each other upon receipt of a control signal from a controller (not shown). Therefore, the bypass valve (75) has a clutch function capable of switching the state of the HST device (24) and the state of the HMT apparatus (T) to the power disengaging state in which no power is transmitted.

The piston pump (30) on the input side of the HST device (24) is constructed in the way as described above. And, also the motor (31) on the output side is constructed substantially in the same way as the piston pump (30), with the exception that the angle of inclination of the swash plate (76) is fixed. Accordingly, for the motor (31), components corresponding to those described with reference to the piston pump (30) are given the same reference numerals, and they are not described in detail here. Both the piston pump (30) and the motor (31) are, as described above, housed in the HST housing portion (40b) in the casing body (40) of the HMT apparatus (T). However, the interior of the HST housing portion (40b) is not filled with operating fluid. Instead, as indicated by a virtual line of FIG. 3, nozzles (80), (80), and so on for discharging operating fluid are provided.

The nozzles (80), (80), and so on may be, for example as shown in the figure, formed so as to open to the inside of the HST housing portion (40b). Alternatively, the nozzles may be formed in the casing body (40). Each nozzle (80) is supplied with operating fluid from the charge pump (70) and sprays the operating fluid. Because of this, in comparison with filling the casing with operating fluid, the rotational resistance of the piston pump (30) and the cylinder barrel (56) of the motor (31) can be reduced greatly. Besides, it is possible to provide adequate lubrication and cooling by a supply of atomized operating fluid to the sliding portion. Further, although not shown in the figure, a drain passageway for the draining of operating fluid is formed in the bottom of the HST housing portion (40b).

Next, the operation of the HMT apparatus (T) will be described. In the first place, the input shaft (25) is rotated by the operation of the engine (13) of the ATV (A). A part of the rotational force is transmitted, through the MT device (23) (i.e., from the input gear (27) mounted on the input shaft (25)) to the ring gear (36) of the planetary gear mechanism (28) and the cylinder barrel (56) of the piston pump (30) is rotated.

By virtue of the rotation of the cylinder barrel (56), the piston (59) reciprocates along the variable swash plate (60) in the tilted state. Because of this, there is a supply of operating fluid between the piston pump (30) and the motor (31). Therefore, a part of the rotational force transmitted to the input shaft (25) is transmitted to the motor (31). In other words, upon receipt of operating fluid supplied through the closed circuit (32), the cylinder barrel (56) of the motor (31) is rotated, and the motor shaft (33) integral with the cylinder barrel (56) is rotated. The resulting rotational force is transmitted to the sun gear (34) mounted on the motor shaft (33).

In the MT device (23), rotational force which is transmitted from the input gear (27) to the ring gear (36) of the planetary gear mechanism (28) and rotational force which is transmitted to the sun gear (34) of the planetary gear mechanism (28) through the HST device (24) are synthesized via the plural planetary gears (35) and the synthesized force is output to the output shaft (26) from the planetary carrier (37). And, rotation of the output shaft (26) is transmitted, through components such as the secondary transmission device (14), the drive shaft (18), the axle shafts (20) and (21), to the front, rear, right, and left wheels (12) and (16) of the ATV (A).

Accordingly, as seen in FIG. 3, in accordance with the hydro-mechanical transmission (HMT) apparatus (T) of the first embodiment, firstly the input shaft (25) and the output shaft (26) of the IMT apparatus (T) are disposed in parallel with each other, and the piston pump (30) and the motor (31) are disposed in coaxial alignment with the input shaft (25) and with the output shaft (26), respectively. As a result of such arrangement, in comparison with the aforesaid conventional HMT apparatus disclosed in Japanese Patent Kokai No. H07-113454, the degree of layout freedom of the section of the HST device (24) is high, thereby making it possible to downsize the HMT apparatus (T) particularly in the axial direction. Because of this, even when an HMT apparatus (T) is positioned immediately underneath the seat (6) on which the driver rides, as in the ATV (A) of the present embodiment, it is possible to easily avoid interference of a driver's leg with the HMT apparatus (T). Further, it is possible to easily secure a space for the secondary transmission device (14) connected to the output shaft (26) of the HMT apparatus (T).

Further, as shown also in FIG. 2, the HMT apparatus (T) is disposed nearer to the vehicle right side than the center of the engine (13) with respect to the vehicle width direction and is located rightmost in the power train. Furthermore, the section of the HST device (24) made up of the piston pump (30) and the motor (31) is located at the vehicle-body right side end, i.e., near to the outside. This facilitates cooling of the section of the HST device (24) by wind produced by vehicle movement. Further, the maintenance of the section of the HST device (24) is easy to perform, thereby improving the reliability. As a result, it is possible to improve the total durability/reliability of the HMT apparatus (T).

Further, in the present embodiment, operating fluid is supplied to the closed circuit (32) of the HST device (24) from the oil sump (71), independently of the oil supply system of the engine (13). This facilitates maintaining the characteristics of operating fluid of the HST device (24) at adequate levels and in addition, inconvenience such as degradation and sludge contamination will not occur. Additionally, in accordance with the present embodiment, the input shaft (25) of the HMT apparatus (T) is directly coupled to the crank shaft (13a) of the engine (13), in other words the provision of a primary speed reducing mechanism, which is usually disposed between these shafts, is omitted. By virtue of such omission, it is possible to achieve weight saving, compacting, and reductions in cost in the entire power train.

Here, in the case the input shaft (25) of the HMT apparatus (T) is connected directly to the crank shaft (13a) of the engine (13), it is preferable that the piston pump (30) be operated to rotate as fast as the engine (13). To this end, in the present embodiment the cylinder barrel (56) is formed integrally with the pump shaft portion (25b) of the input shaft (25) so that the rotational movement of the cylinder barrel (56) is free from run-out (i.e., eccentricity) and in addition, it is constructed such that the interior of the HST housing portion (40b) is not filled with operating fluid. And, it is arranged such that the allowable rotational speed of the cylinder barrel (56) is increased up to for example about 6000 rpm.

Embodiment 2

Figure 5:
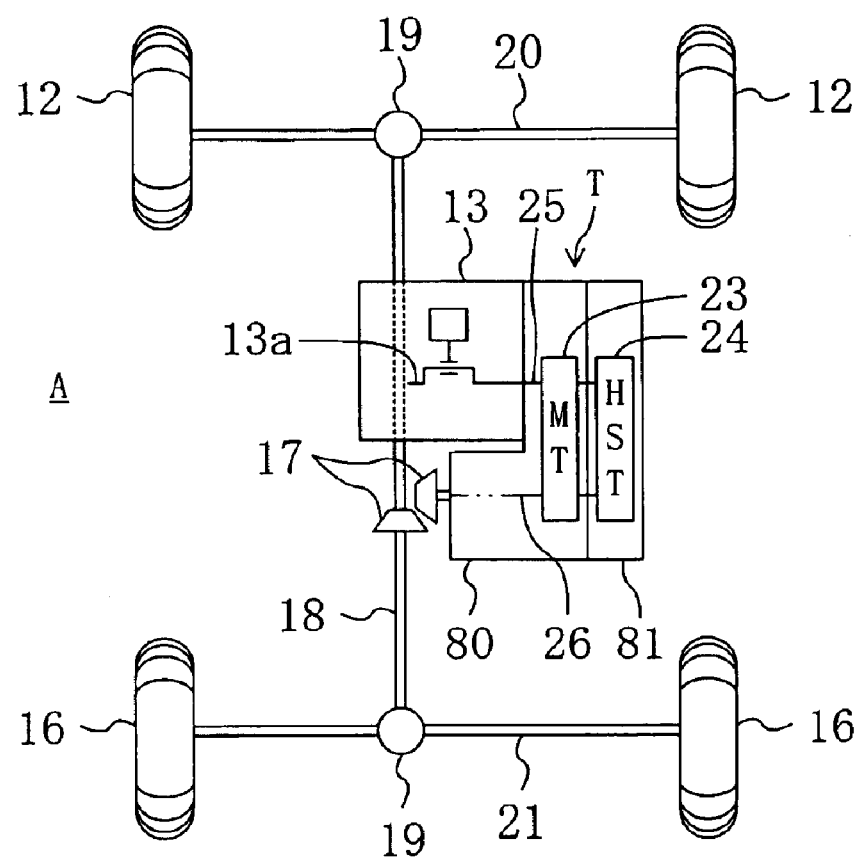
FIG. 5 is a view of Embodiment 2 which corresponds to FIG. 2.

Referring now to FIG. 5, there is shown a power transmission system path construction of an ATV (A) which is equipped with an HMT apparatus (T) according to a second embodiment of the present invention. The second embodiment employs such a structure that the casing of the HMT apparatus (T) can be divided into an HST-side part and an MT-side part. Except for that, the arrangement of the HMT apparatus (T) of the second embodiment is the same as the HMT apparatus (T) of the foregoing first embodiment. Therefore, the same components have been assigned the same reference numerals and their description is omitted. And, as shown in FIG. 5, in accordance with the second embodiment it is arranged such that the casing of the HMT apparatus (T) can be divided into an MT casing (80) for housing therein the MT device (23) and an HST casing (81) for housing therein the HST device (24), and the MT casing (80) is formed integrally with the casing of the secondary transmission device (14).

Figure 6:
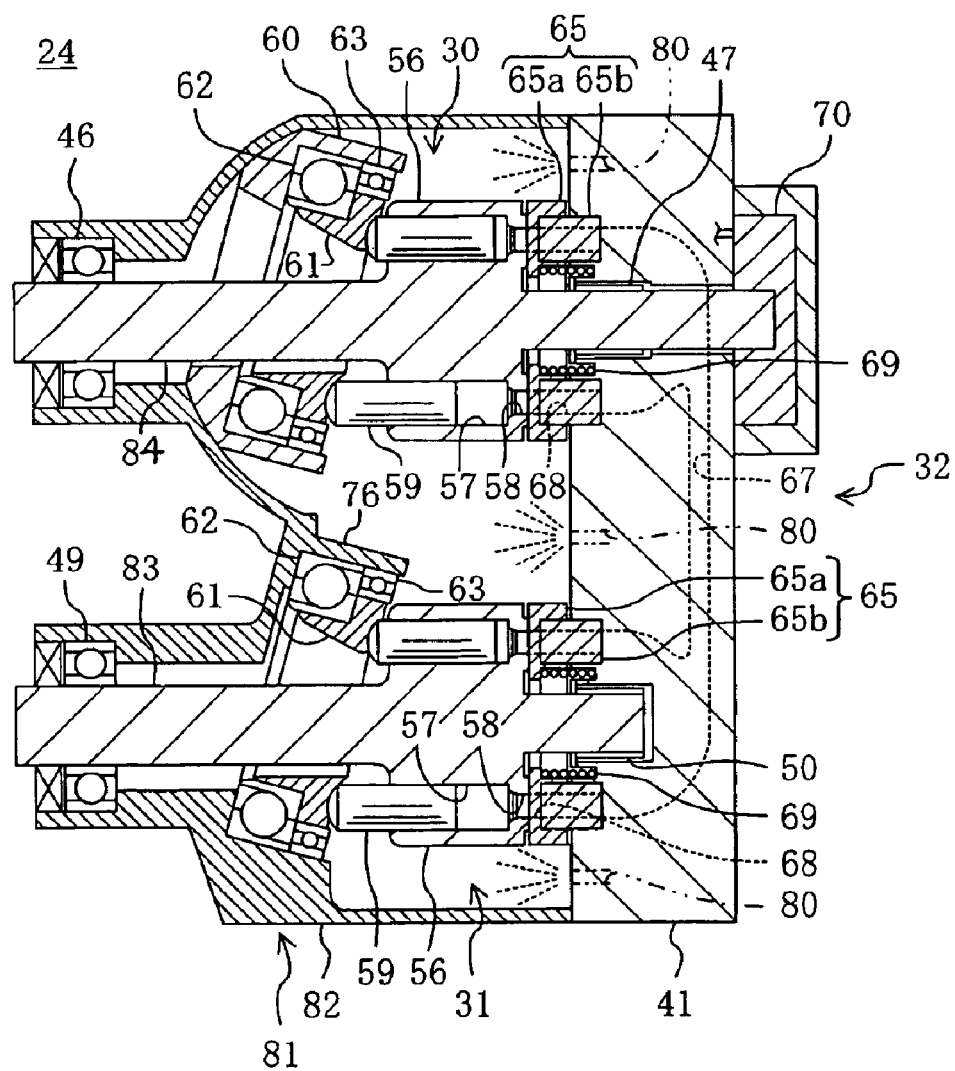
FIG. 6 is a view of Embodiment 2 which corresponds to FIG. 3.

Referring to FIG. 6, the HST casing (81) comprises a casing body (82) which houses the piston pump (30) together with the motor (31) and an end cap (41) which closes an opening end of the casing body (82). A pump shaft (83) of the piston pump (30) is formed as a separate body from a portion having the original function of the input shaft, with an area indicated by a virtual line C of FIG. 3 serving as a border. The pump shaft (83) is supported by the roller bearings (46) and (47) mounted on the casing body (82) and on the end cap (41), respectively, and is coupled to an end of the input shaft (not shown) by coupling or the like.

Further, like the pump shaft (83), a shaft (84) of the motor (31) is also formed as a separate body from a central shaft (not shown) of the planetary gear mechanism (28). The shaft (84) is supported by the roller bearings (49) and (50) mounted on the casing body (82) and on the end cap (41), respectively, and is coupled to an end of the central shaft by coupling or the like.

Therefore, in accordance with the second embodiment, the same operation and effects as the first embodiment can be obtained. Additionally, since the HST casing (81) is a separate structure from the MT casing (82), this makes it possible to easily remove from the HMT apparatus (T) only the section of the HST device (24) located near to the outside of the vehicle body in the power train. Besides, the HST device (24) can be maintained extremely easily and in addition, it is possible to subject the HST device (24) to independent running testing. This makes it possible to greatly improve not only the reliability of the HST device (24) but also the reliability of the HMT apparatus (T).

Embodiment 3

Figure 7:
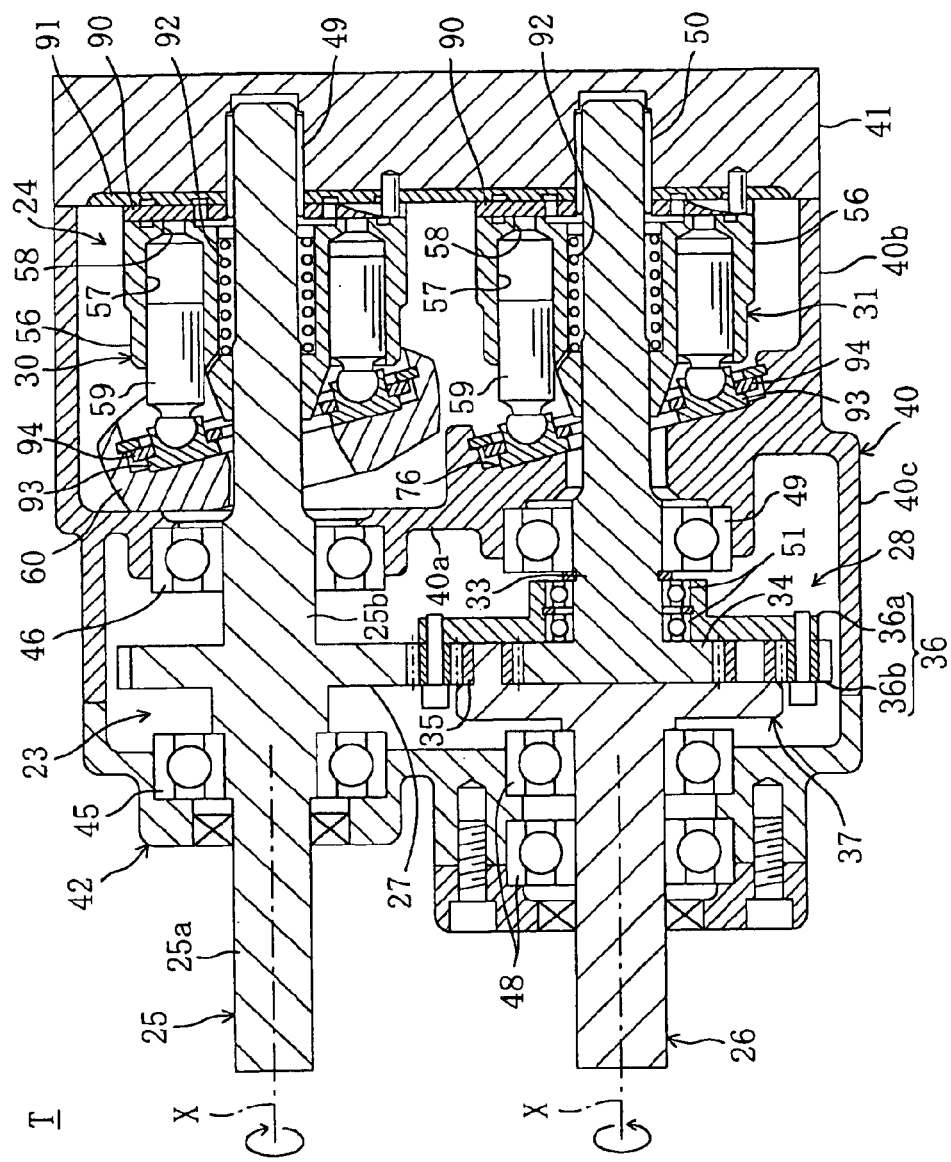
FIG. 7 is a view of Embodiment 3 which corresponds to FIG. 3.

Referring now to FIG. 7, there is shown an HMT apparatus (T) according to a third embodiment of the present invention. In the third embodiment, the cylinder barrel (56) is formed as a separate body from the pump shaft portion (25b) and the motor shaft (33) of the input shaft (25) and they are coupled together by clearance fitting, as the piston pump (30) and the motor (31) of the HMT apparatus (T). With this, the input gear (27) of the MT device (23) is formed integrally with the input shaft, and the sun gear (34) of the planetary gear mechanism (28) is formed integrally with the motor shaft (33).

Further, in the piston pump (30) and the motor (31), a valve plate (90) having a general construction is employed in place of the floating type valve plate (65) used in the foregoing embodiments, and it is arranged such that the valve plate (90) is pressed and energized against a sliding contact plate member (91) which is disposed at the rear side of the end cap (41).

Furthermore, in the piston pump (30) and the motor (31), the construction that the thrust plate (61) is supported on the swash plate (60, 76) through the roller bearings (62) and (63) is disused. On the other hand, a slipper (93) and a slipper presser (94) are employed instead.

Except for the structure of such particular parts, the construction of the HMT apparatus (T) of the third embodiment is substantially the same as the HMT apparatus (T) of the first embodiment. Therefore, the same components have been assigned the same reference numerals and their description is omitted.

And, in the third embodiment the same operation and effects as the first embodiment can be obtained and in addition, it is possible to cut production costs by partially simplifying the structure of the HMT apparatus (T).

Other Embodiments

It is to be noted that the present invention is not limited to the arrangements of the first to third embodiments. The present invention includes other various arrangements. In other words, in each of the embodiments the HMT apparatus (T) is disposed near to the right side of the vehicle body in the power train and the section of the HST device (24) is disposed nearer to the vehicle-body right side than any other components in the HMT apparatus (T). Stated another way, the one side is the vehicle-body right side whereas the other side is the vehicle-body left side. Conversely, the HMT apparatus (T) and the HST device (24) may be disposed near to the vehicle-body left side, wherein the one side is the vehicle-body left side whereas the other side is the vehicle-body right side.

Further, in each of the foregoing embodiments the HMT apparatus (T) according to the present invention is applied to the ATV (A). Other than this, the HMT apparatus (T) of the present invention is applicable to for example agriculture vehicles such as a tractor, industrial vehicles such a forklift, or other vehicle such as a golf cart.

INDUSTRIAL APPLICABILITY

As described above, the hydro-mechanical transmission apparatus according to the present invention is excellent in durability and reliability, provides easy maintenance, and has a compact structure. Therefore, the hydro-mechanical transmission apparatus of the present invention is suitably used as a transmission apparatus for ATVs such as a four-wheeled buggy vehicle, a tractor, a motor bicycle, or the like.

What is claimed is:

1. A hydro-mechanical transmission apparatus, comprising:
   an input shaft,
   an output shaft,
   a mechanical transmission device having a casing and a differential gear mechanism which is interposed between said input shaft and said output shaft, and
   a hydro-static transmission device having a casing, a hydraulic pump which is connected to said input shaft, and a hydraulic motor which is connected to said hydraulic pump by a closed circuit as well as to said output shaft through said differential gear mechanism, wherein at least one of said pump and said motor is variable in displacement, wherein:
   said input shaft and said output shaft are laid out in parallel with each other, said hydraulic pump is connected to one side end in axial direction of said input shaft whereas the other side end of said input shaft is connected to a shaft of a drive source and an input gear of said mechanical transmission device is mounted on between said both ends of said input shaft so as to rotate integrally therewith, said differential gear mechanism is connected to the one side end in axial direction of said output shaft and said hydraulic motor is connected to said one side of said differential gear mechanism, and said casing of said hydro-static transmission device and said casing of said mechanical transmission device are of separate structures, such that said hydro-static transmission device, said mechanical transmission device, said casing of said hydro-static transmission device, and said casing of said mechanical transmission device can be separated from each other.

2. The hydro-mechanical transmission apparatus of claim 1,
wherein said input shaft is connected to said shaft of said drive source in such a way that said input shaft receives output rotation directly from said shaft.

3. The hydro-mechanical transmission apparatus of claim 1,
wherein a secondary transmission device is connected to the other side end of said output shaft.

4. The hydro-mechanical transmission apparatus of claim 1, wherein said casing of said hydro-static transmission device comprises:
a casing body, which houses said pump together with said motor, and
an end cap, which closes an opening end of said casing body and forms a close circuit connecting said pump and said motor, said end cap being arranged in said one side end of said casing.

5. A vehicle equipped with a transmission apparatus which changes the speed of output rotation from a drive source for transfer toward wheels and,
wherein:
said drive source is sideways-mounted on said vehicle, with a shaft of said drive source oriented in a vehicle width direction,
said transmission apparatus is a hydro-mechanical transmission apparatus comprising: an input shaft; an output shaft; a mechanical transmission device having a casing and a differential gear mechanism which is interposed between said input shaft and said output shaft; and a hydro-static transmission device having a casing, a hydraulic pump which is connected to said input shaft, and a hydraulic motor which is connected to said hydraulic pump by a closed circuit as well as to said output shaft through said differential gear mechanism, wherein at least one of said pump and said motor is variable in displacement, said mechanical transmission device and said hydro-static transmission device are disposed nearer to one side of the vehicle body with respect to a vehicle width direction than the center of said drive source, said input shaft and said output shaft extend parallel with said shaft of said drive source in a vehicle width direction and are disposed in parallel with and separated apart from each other in a vehicle body longitudinal direction, said hydraulic pump is connected to one side end in vehicle width direction of said input shaft whereas the other side end of said input shaft is connected to a shaft of a drive source and an input gear of said mechanical transmission device is mounted on between said both ends of said input shaft so as to rotate integrally therewith, said differential gear mechanism is connected to the one side end in vehicle width direction of said output shaft and said hydraulic motor is connected to the one side in vehicle width direction of said differential gear mechanism, and said casing of said hydro-static transmission device and said casing of said mechanical transmission device are of separate structures, such that said hydro-static transmission device, said mechanical transmission device, said casing of said hydro-static transmission device, and said casing of said mechanical transmission device can be separated from each other.

6. The vehicle of claim 5 which is equipped with said hydro-mechanical transmission apparatus,
wherein at least a part of said transmission apparatus is located underneath a driver's seat of said vehicle.

7. The vehicle of claim 5 which is equipped with said hydro-mechanical transmission apparatus, wherein said casing of said hydro-static transmission device comprises:
a casing body, which houses said pump together with said motor, and
an end cap, which closes an opening end of said casing body and forms a close circuit connecting said pump and said motor, said end cap being arranged in said one side end of said casing.

* * * * *